(12) United States Patent
Ibendorf et al.

(10) Patent No.: US 9,249,780 B2
(45) Date of Patent: Feb. 2, 2016

(54) DEVICE AND METHOD FOR DETERMINING A BLADE POSITION AND FOR ENDING A SAFETY RUN

(75) Inventors: Ingo Ibendorf, Rostock (DE); Reinhard Vilbrandt, Rostock (DE)

(73) Assignee: SUZLON ENERGY GMBH, Rostock (DE)

( * ) Notice: Subject to any disclaimer, the term of this patent is extended or adjusted under 35 U.S.C. 154(b) by 145 days.

(21) Appl. No.: 14/111,382

(22) PCT Filed: Apr. 16, 2012

(86) PCT No.: PCT/EP2012/056935
§ 371 (c)(1),
(2), (4) Date: Oct. 11, 2013

(87) PCT Pub. No.: WO2012/140267
PCT Pub. Date: Oct. 18, 2012

(65) Prior Publication Data
US 2014/0028025 A1  Jan. 30, 2014

(30) Foreign Application Priority Data
Apr. 14, 2011  (DE) .................. 10 2011 007 440

(51) Int. Cl.
*F03D 7/04* (2006.01)
*F03D 7/02* (2006.01)
*F03D 11/00* (2006.01)

(52) U.S. Cl.
CPC .......... *F03D 7/0224* (2013.01); *F03D 11/0091* (2013.01); *F05B 2260/845* (2013.01); *F05B 2270/328* (2013.01); *F05B 2270/602* (2013.01); *Y02E 10/722* (2013.01); *Y02E 10/723* (2013.01)

(58) Field of Classification Search
USPC ......... 318/264–266, 272, 275, 277, 282, 286, 318/466–469, 626; 290/43, 44, 54
See application file for complete search history.

(56) References Cited

U.S. PATENT DOCUMENTS 4,161,658 A * 7/1979 Patrick .......................... 290/44
4,355,955 A   10/1982 Kisovec
(Continued)

FOREIGN PATENT DOCUMENTS

DE   10 2005 034899 A1   2/2007
DE   10 2006 023411 A1   11/2007
(Continued)

OTHER PUBLICATIONS

German Search Report dated Mar. 22, 2012.
(Continued)

*Primary Examiner* — Bentsu Ro
(74) *Attorney, Agent, or Firm* — Norris McLaughlin & Marcus PA

(57) ABSTRACT

A wind turbine assembly has a hub, a rotor blade, a bearing that can be installed between the rotor blade and the hub, and an adjusting device. The rotor blade is arranged on the hub so as to be rotatable substantially its longitudinal axis. The adjusting device comprises at least one electric adjusting motor, which drives a gear connected to the rotor blade by means of a drive pinion, a converter coupled to an electric network and controlling the adjusting motor, and a control unit for the adjusting motor. The adjusting device comprises means for producing a signal that depends on the adjustment position of the rotor blade and an evaluating unit for comparing the signal or a derivative of the signal.

14 Claims, 6 Drawing Sheets

(56) References Cited

U.S. PATENT DOCUMENTS

Figure 1:
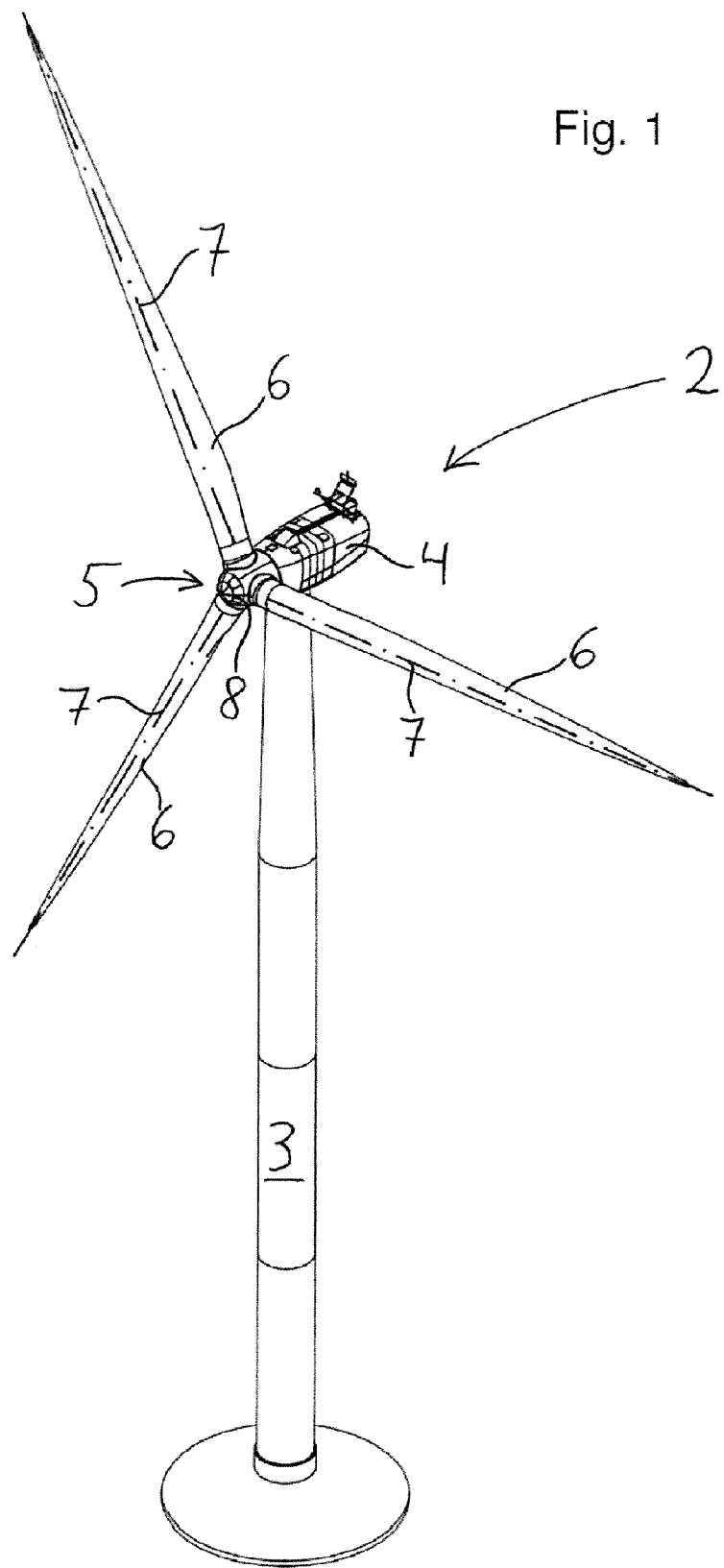

| | | | | |
|---|---|---|---|---|
| 4,584,486 | A | * | 4/1986 | Quynn .......................... 290/44 |
| 4,792,281 | A | * | 12/1988 | Coleman ....................... 416/156 |
| 2006/0163882 | A1 | | 7/2006 | Brandt |
| 2008/0290664 | A1 | | 11/2008 | Kruger |
| 2009/0115191 | A1 | | 5/2009 | Warfen |
| 2009/0155075 | A1 | | 6/2009 | Guey et al. |
| 2010/0124498 | A1 | | 5/2010 | Kabatzke et al. |

FOREIGN PATENT DOCUMENTS

| | | |
|---|---|---|
| DE | 10 2008 057934 A1 | 5/2010 |
| DE | 10 2009 018361 A1 | 11/2010 |
| DE | 10 2010 027003 A1 | 1/2012 |
| EP | 2 058 513 A2 | 5/2009 |
| WO | 2005/017350 A1 | 2/2005 |
| WO | 2010/086688 A1 | 8/2010 |

OTHER PUBLICATIONS

International Search Report dated Aug. 13, 2012, mailed Aug. 21, 2012.

English Translation International Search Report dated Aug. 13, 2012, mailed Aug. 21, 2012.

* cited by examiner

DEVICE AND METHOD FOR DETERMINING A BLADE POSITION AND FOR ENDING A SAFETY RUN

This application is a 371 application of PCT/EP2012/056935 Apr. 16, 2012, which claims foreign priority benefit under 35 U.S.C. §119 of German application 10 2011 007 440.6 filed Apr. 14, 2011.

The invention relates to an adjusting device for a rotor blade of a rotor of a wind turbine. The rotor includes a hub, a rotor blade, a bearing mountable between the rotor blade and the hub as well as the adjusting device. The bearing includes an inner ring and an outer ring which can rotate relative to each other. The rotor blade is thus essentially arranged on the hub for rotation about its longitudinal axis. The rotor blade is adjustable in different adjustment positions with the adjusting device. The adjusting device includes at least one electric adjusting motor which drives via a drive pinion a gear and is connected to the rotor blade, a converter which is coupled to an electrical grid and controls the adjusting motor, and a control unit for regulating the adjusting motor. Moreover, the invention relates to a method for adjusting the rotor blade of a wind turbine.

Wind turbines with adjustable blades have an advantage in that the power consumption and the drive torque of the rotor can be influenced by changing the blade pitch. In the event of a malfunction, a safety run of the rotor blades can thus be controlled via an adjusting device, wherein the rotor blades turn into the so-called vane position. The vane position is attained when the rotor blade has rotated out off the wind, thereby exposing only one minimum contact surface of the rotor blade to the wind. The energy necessary to maintain the rotary motion of the rotor can then no longer be captured, so that the wind turbine stops or is at least decelerated.

To monitor the adjusting device and the blade adjustment process, conventional wind turbines include a plurality of sensors; for example, one sensor monitors the position the adjusting motor and another sensor the position the blade-side sprocket. In addition, limit switches delimiting the blade adjustment range are provided. Such limit switches are to their high precision mostly implemented as a gearbox due, with a gear and a switch being housed in a common housing. The rotation the rotor blade is introduced into the gear e.g. via a pinion in engagement with the rotor-blade-side sprocket. After a predetermined revolution, the switch is actuated by a cam connected to the gear. Disadvantageously, however, the gearbox is expensive.

A wind turbine with such adjusting device is widely known in the art. For example, EP 2 058 513 A2 discloses a wind turbine with an adjusting device for varying the angle of attack of the rotor blades. The adjusting device has here an electric adjusting motor which is coupled via a converter with an electrical power grid. The electric adjusting motor transmits its torque via a drive pinion to a gear associated with the rotor blade. The adjusting device further includes a control unit for regulating a blade adjustment process and two limit switches for monitoring the blade adjustment process, wherein the first limit switch is configured to detect a rotation the rotor blade beyond the vane position. When the first limit switches is triggered, the rotor blade is mechanically slowed down by a brake of the adjusting device. The second limit is triggered when the adjustment process fails to come to a stop in spite of braking, and reports—upon being triggered—a malfunction in the brake system to an operational management. The operational management then requests service of the wind turbine. A downside of the conventional wind turbine is that e.g. no emergency shutdown occurs when the first limit switch fails.

It is therefore an object of the invention to provide an improved adjusting device which obviates the disadvantages of the prior art. In particular, an adjusting device for a rotor blade of a wind turbine is to be disclosed which has a device for determining an angle of attack and for ending a safety run of the rotor blade.

The object is attained according to the invention with the characteristic features of the independent claim, 1 in that the adjusting device includes an adjusting motor, a converter, a control unit and a device for determining a blade position. The device for determining the blade position includes means for generating a signal depending on the pitch position of the rotor blade and an evaluation unit for comparing the signal or a derivative of the signal. The signal depending on the pitch position may be, for example, a speed, an acceleration or an absolute position. The means for generating the signal depending on the pitch position of the rotor blade may be implemented, inter alia, as absolute sensors, which depending on the blade adjustment range are either a single-turn sensor or a multi-turn sensor, as resolvers, as potentiometric sensors or as incremental sensors. Advantageously, an already existing sensor for monitoring the adjusting device may be used. Preferentially, several of the existing sensors may be used as the means, whereby a control unit can perform a plausibility check of the supplied signals. When an sensor fails, the control unit can switch to the signal from the other sensors, thus maintaining the function of the adjusting device.

In another embodiment, the signal depending on the pitch position of the rotor blade can be generated directly in the converter. The signal depending on the pitch position of the rotor blade is in this case the current and/or voltage curve. For example, the revolution and thus the position of the adjusting motor can be calculated in the evaluation unit from the current and/or voltage curve by a vector field analysis.

The evaluation unit has at least one signal input for receiving a signal depending on the pitch position. The signal can come either directly from the means or indirectly via the control unit of the converter. The signal is analyzed and processed in the evaluation unit unless already provided by the means as an absolute angular position. The signal processing may include, for example, comparing the signal from an incremental sensor with a reference value from another sensor to thus determine the absolute position of the rotor. The evaluation unit is normally integrated in the control unit, but may also be implemented as a separate module for retrofit purposes and be connected via a signal input and a signal output to the control unit. The vector analysis of the current supplied to the adjusting motor is also performed in the evaluation unit.

The signal from the means or the derivative the signal processed by the evaluation unit is thereafter compared with threshold values stored in a memory of the control unit. When a first threshold value is reached, the evaluation unit sends a signal to the control unit to terminate the blade adjustment process. The control unit then switches off the control current and/or control voltage from the converter to the adjusting motor, thus terminating the adjustment process.

In particular, the invention is characterized in that the first device according to the invention for determining a blade position does not include mechanical limit switches, wherein a switch must be operated by an actuating device, for example gear boxes or micro-switches. This concerns only the first device and of course not the emergency shutdown device described below.

To prevent the rotor blade from rotating too far in a safety run, for example when the first device determining the blade position malfunctions, the adjusting device includes in another exemplary embodiment an emergency shutdown device for monitoring a pitch position of the rotor blade.

The emergency shutdown device comprises, like the first device, means for generating a signal depending on the pitch position the rotor blade and an evaluation unit for comparing the signal or a derivative of the signal. The means and the evaluation unit of the second device may be the same as those of the first device, whereas the emergency shutdown device may have either separate means or a separate evaluation unit. To attain a necessary redundancy, the emergency shutdown device advantageously has separate means for generating a signal depending on the pitch position the rotor blade and a separate evaluation unit. The means for generating the signal may be of the same type as the means of the first device. The signal from the means is analyzed and processed in the second evaluation unit, unless it is already outputted by the means as an absolute angular position. Thereafter, the signal generated by the means or the derivative of the signal processed by the evaluation unit is compared with the threshold values stored in the memory of the control unit. When a second threshold value is reached, the control unit disconnects the adjusting device from the current and/or voltage supply.

In another exemplary embodiment, the emergency shutdown device for determining a blade position, unlike the first device, may be implemented as a mechanical limit switch. The mechanical switch may be arranged on the hub the rotor and actuated by an actuating means arranged on the rotor blade when the desired switch-off position is reached. When the switch actuated, a switching signal is transmitted to the control unit and the control unit disconnects the adjusting device from the current and/or voltage supply. To restart the wind turbine, after the adjusting device has been disconnected from the voltage supply, the adjusting device must be checked and reset by a service technician. This prevents operation of the wind turbine in the presence of a system error.

The first threshold value responsible for the completion of the safety run may be in a range between 85° and 95°. Advantageously, the threshold value is 90°, corresponding to the vane position of the rotor blade. The second threshold value responsible for the voltage shutdown may be in an adjacent range between 95° and 100°. Advantageously, the second threshold value is 95°. In another embodiment, the blade adjustment range may instead be limited in the operating direction. The maximum rotor torque can be reduced by storing a threshold value in a range between 0° and −10°. When the threshold value is reached, for example a safety run of the rotor blade can be initiated, wherein the rotor blade moves from the highly stressed range towards the vane position. Advantageously, the threshold value in the operating direction is −5°. Several threshold values may also be stored, allowing an upper and a lower limit of the blade adjustment range to be set.

Additional functions can advantageously be readily implemented with device according to the invention for determining a pitch position of the rotor blade. The stored threshold values may be quickly changed for test purposes, during startup or service of the wind turbine; for example, the threshold values for terminating the blade adjustment process or for disconnecting the voltage supply may be bypassed so that greater blade angles can be set and the rotor may also operated in the reverse direction.

The adjusting motor is coupled to the electrical power grid via the converter and may be designed either as a DC motor or as an AC motor. The control current supplied from the converter to the adjusting motor can be varied with the control unit of the converter, whereby the speed of the adjusting motors can be adjusted. In one embodiment, the adjusting motor is arranged on the hub and drives via a drive pinion disposed on an output shaft of the adjusting motors an internal geared ring of the bearing connected to the rotor blade. In another embodiment, the adjusting motor is arranged on the rotor blade and drives via the drive pinion a sprocket connected to the hub.

A safety run of the rotor blades can be initiated e.g. when a sensor in the wind turbine reports a malfunction of the control unit of the adjusting device. The control unit then initiates via the converter a blade adjustment process towards the vane position. During the blade adjustment process, the means generate a signal depending on the pitch position of the rotor blade, which is then forwarded to the evaluation unit. The signal is processed in the evaluation unit and compared with a stored threshold value. When a first threshold value is reached, a signal is transmitted to the control unit of the converter, and the control unit terminates the blade adjustment process.

In another embodiment, another signal depending on the pitch position of the rotor blade is generated by a separate means during the blade adjustment process. This signal is forwarded to a separate evaluation unit where the signal is processed and compared with a stored threshold value. When the first threshold value is crossed without terminating the blade adjustment process, a signal is transmitted to the control unit when a second threshold value is reached, and the control unit disconnects the adjusting device from the voltage supply.

Further details of the invention can be inferred from the drawings based on the description.

Figure 2:
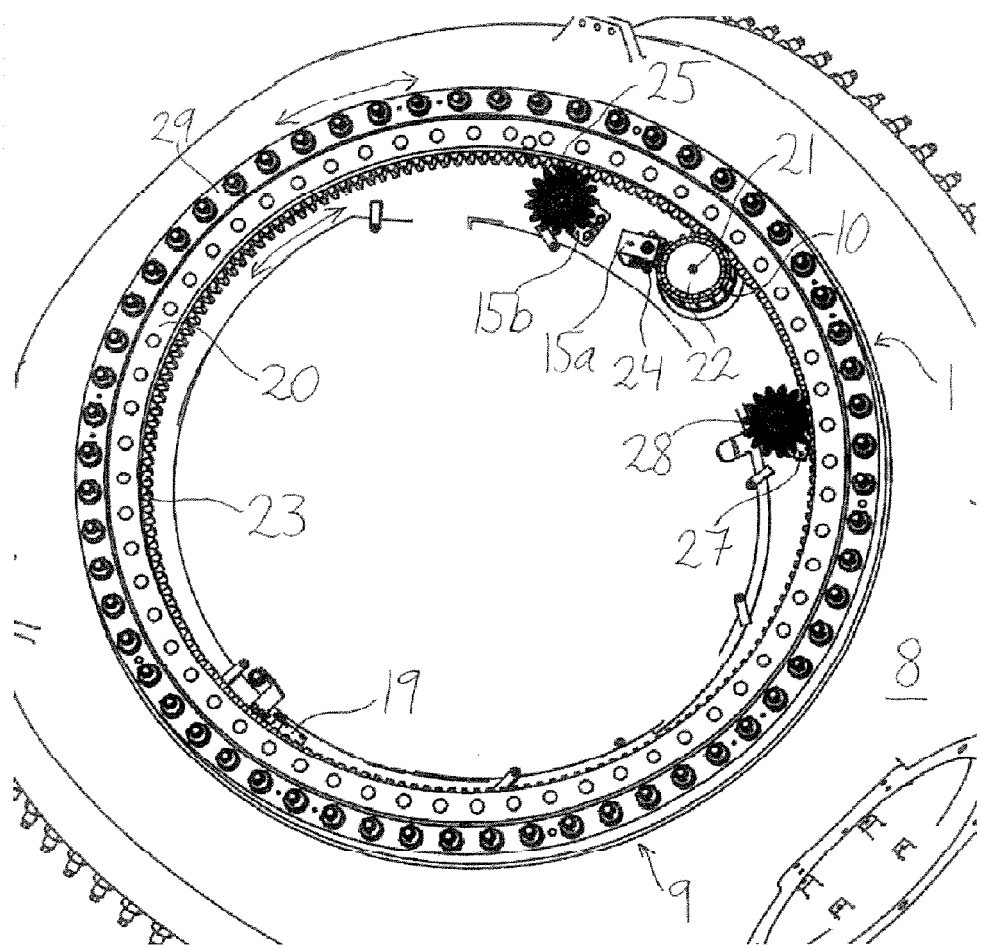
Figure 3:
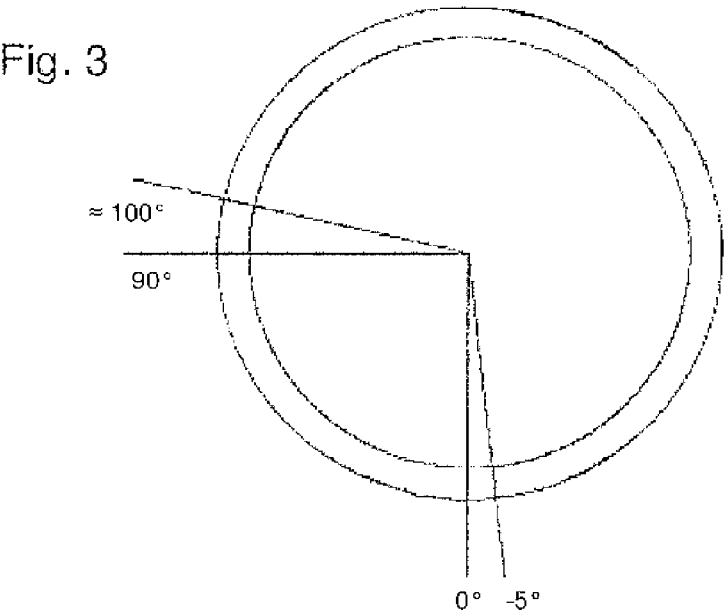
Figure 4:
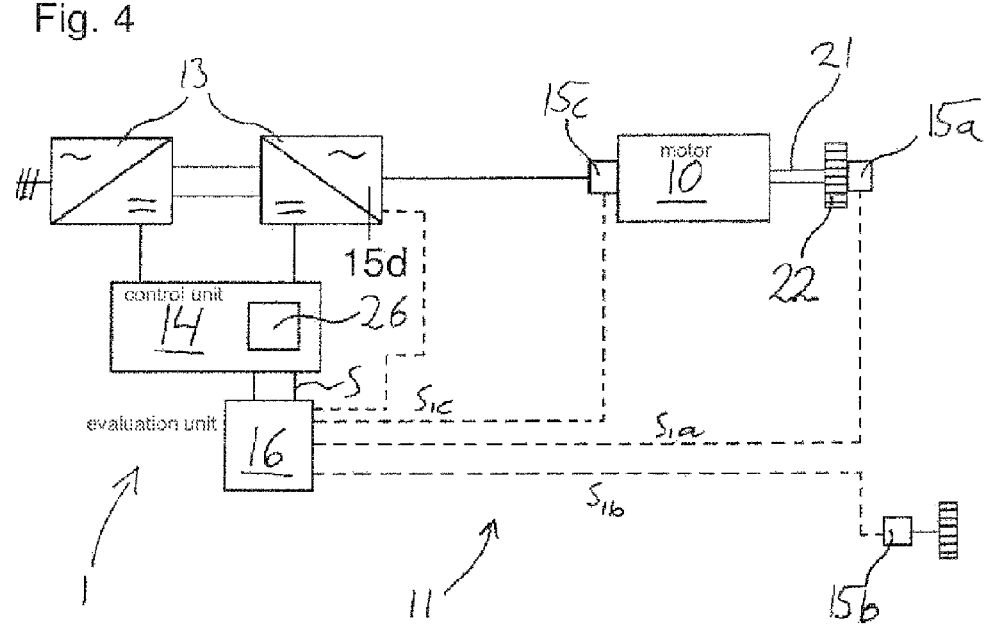
Figure 5:
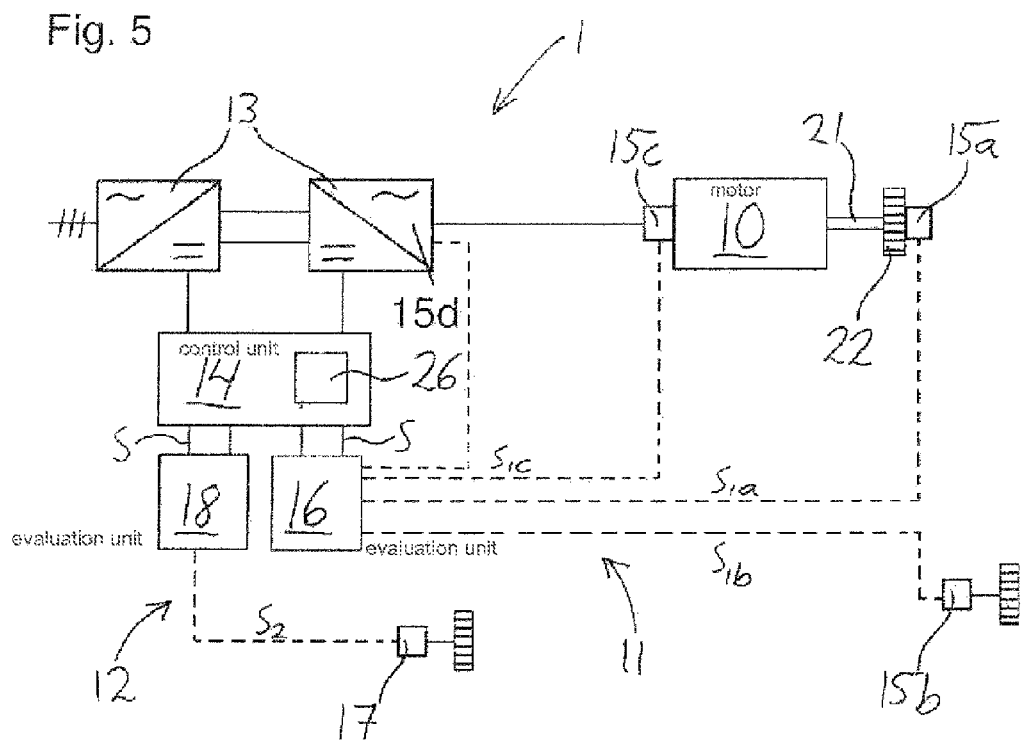
Figure 6:
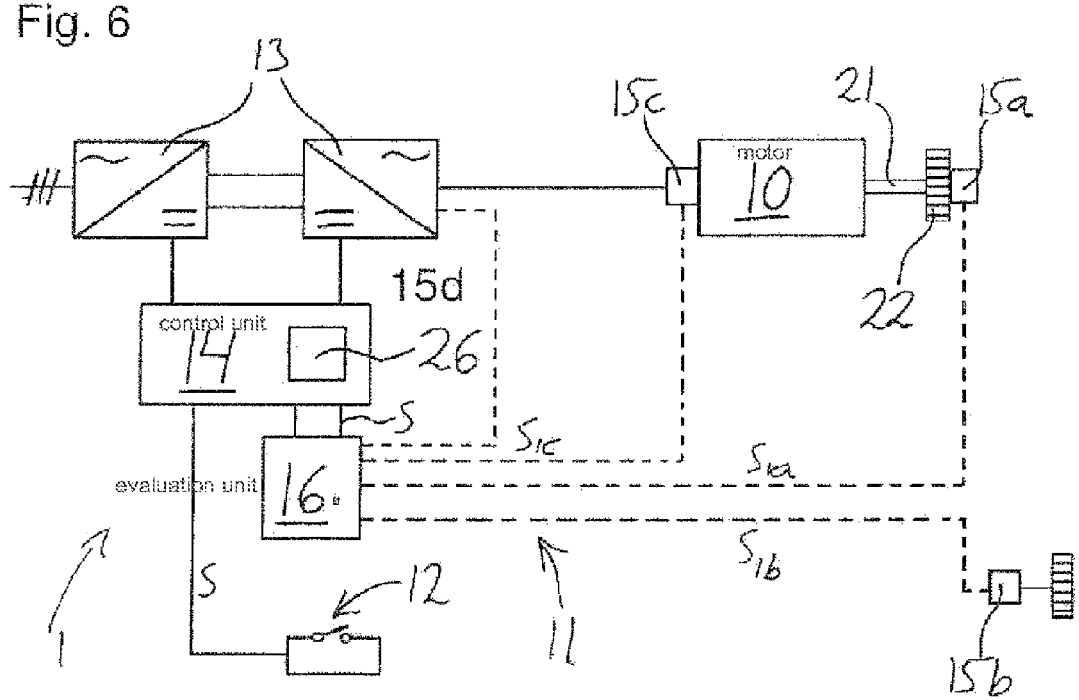
Figure 7:
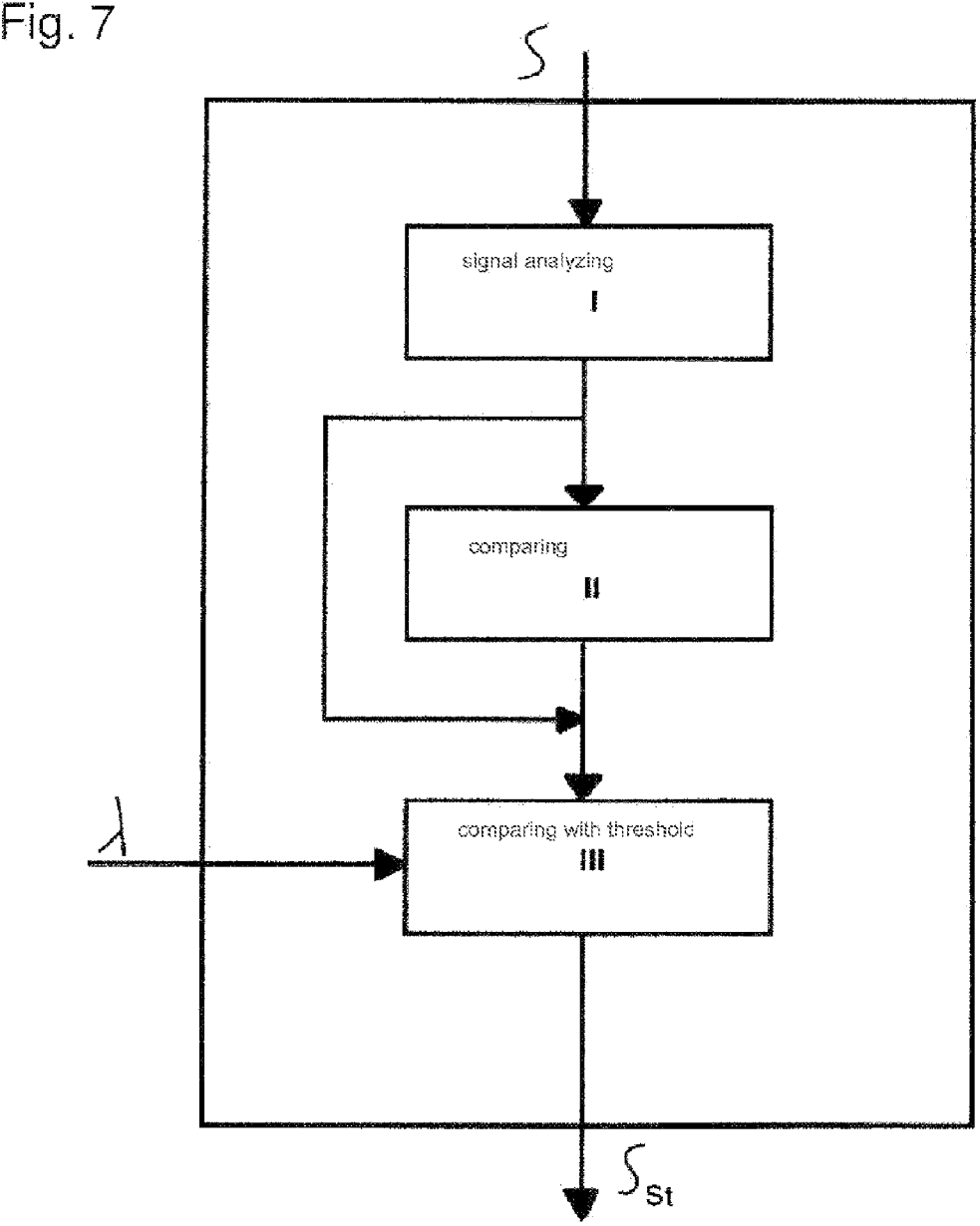

The figures show in:

FIG. 1 a wind turbine,

FIG. 2 a hub with a conventional adjusting device and the device according to the present invention for determining a pitch position of the rotor blade, FIG. 3 an adjusting device with a first device for determining a pitch position of the rotor blade, FIG. 4 an adjusting device with a first device and a second device for determining a pitch position of the rotor blade, FIG. 5 an adjusting device with a first device and a second device for determining a pitch position of the rotor blade, FIG. 6 an adjusting device with a first device and a second device for determining a pitch position of the rotor blade, and FIG. 7 processing steps in the evaluation unit.

FIG. 1 shows a wind turbine 2 with a tower 3, a nacelle 4 rotatable supported on the tower 3 and a rotor 5 connected by a rotor shaft with a generator arranged in the nacelle 4. The rotor 5 includes a hub 8, three rotor blades 6 which are supported for rotation about a blade axis 7, and a bearing 9 mounted between the hub 8 and the rotor blade 6. The bearing is composed of an outer ring connected to the hub 8 and an inner ring 23 rotatable relative to the outer ring 29 and connected to the rotor blade 6. Each rotor blade 6 also includes an adjusting device 1 for adjusting the pitch position the rotor blade 6. The adjusting device 1 includes for this purpose an adjusting motor 10, a drive pinion 22 disposed on an output shaft 21 of the adjusting motors 10, a sprocket 23 in engagement with the drive pinion 22, a converter 13 for supplying a current and/or a voltage to the adjusting motor 10, and a control unit 14 for controlling and/or regulating the converter 13.

FIG. 2 shows the hub 8 with a conventional adjusting device 1 and the inventive first device for determining a pitch position of the rotor blade 6. In an adjustment process, the conventional adjusting motor 10 arranged on the hub 8 drives via a drive pinion 22 an internal geared ring 23 of the bearing 9 connected to the rotor blade 6, wherein the inner ring 20 of the bearing 9 connected to the rotor blade and the outer ring 29 of the bearing 9 connected to the hub 8 rotate relative to each other. The adjusting motor 10 is connected via a converter 13 to the electric power grid. According to the prior art, the rotation of the rotor blade is monitored with a means 15*a* for generating a signal depending on the pitch position of the rotor blade 6 and a limit switch 27 constructed as a gearbox. The first means 15*a* is embodied as a resolver, which is in engagement with the drive pinion 22 of the adjusting motor 10 via a gear wheel 24 and thus monitors the rotation of the adjusting motor 10. The gearbox includes a gear and a switch accommodated in a common housing. The rotation of the rotor blade 6 is introduced into the gear via a pinion 28 that is in engagement with the blade-side sprocket 23. After a predetermined revolution, the switch is actuated by a cam connected to the gear.

In the adjusting device 1 according to the invention, a second means 15*b* for generating a signal depending on the blade position is added to the first means 15*a*. The second means 15*b*, which can also be constructed as a resolver, is in engagement with the internal geared ring 23 of the bearing 9 via a gear wheel 25 and monitors the rotation of the rotor blade 6. The two means 15*a*, 15*b* may be connected to a control unit 14 of the converter 13 and their signals may be used to position the rotor blade 6. The signal from the blade-side means 15*b* can be used when precise positioning of the rotor blade 6 is desired. The signal from the motor-side means 15*a* can be used when precise control of the adjusting motors 10 is desired. The control unit 14 can also compare the two signals for checking the plausibility of the signals. When one of the means 15*a*, 15*b* fails, the control unit 14 can switch to the second functioning means 15*a*, 15*b*, in order to maintain the function of the adjusting device. The signals from the means 15*a*, 15*b* are compared in the control unit 14 with stored threshold values, wherein for example the adjustment process can be changed or the adjustment process can be terminated when the threshold values are reached. Due to the redundancy of the two switches 15*a*, 15*b*, the adjustment process can be completely monitored and terminated in the control unit of the converter, thereby eliminating the limit switch 27 embodies as a gearbox. By eliminating the gearbox, both installation space as well as costs for the expensive gearbox can be reduced.

The adjusting device may be provided with an emergency shutdown device for emergency shutdown of the adjusting device 1 in the event of failure of the control unit 14 or of the means 15*a* and 15*b*. The emergency shutdown device is in this embodiment composed of a limit switch 19 constructed as a microswitch, wherein the microswitch is actuated by an actuating element connected to the rotor blade 6 when a specific switch-off position is reached. When the microswitch is actuated, the current and voltage supply of the adjusting device is interrupted, preventing further rotation of the rotor blade. The microswitch has advantageously a low installed height and is inexpensive.

FIG. 3 shows an allowed adjustment range of the rotor blade 6. The range between −5° and 90° corresponds to the adjustment range set in normal operation. The pitch position 0° corresponds here to a rotor blade 6 fully facing the wind and 90° corresponds to a rotor blade 6 in the vane position. The first threshold value $\lambda_1$ for terminating the safety run of the rotor blade 6 is hence 90°. The range between 100° and −5° is a prohibited range and must not be attained by the rotor blade. To prevent the rotor blade from entering the prohibited range, a second and a third threshold value $\lambda_2$, $\lambda_3$ is stored. When the first threshold value $\lambda_1$ is crossed without completion of the safety run, the adjustment device is disconnected from the voltage supply when the second threshold value $\lambda_2$ at 100° is reached. The allowed blade adjustment range is limited in the operating direction by the third threshold value $\lambda_3$ at 5°. When the threshold value $\lambda_3$ is reached, a safety run of the rotor blade 6 is initiated and the rotor blade 6 moves towards the vane position.

FIG. 4 illustrates an adjusting device 1 according to the invention. The adjusting device 1 includes a converter 13, an adjusting motor 10, a control unit 14, and a device 11 for determining a blade position. The device 11 for determining a blade position includes at least one means 15*a*, 15*b* or 15*c* for generating a signal depending on the pitch position of the rotor blade and an evaluation unit 16. The adjusting motor 10 is coupled to the electric power grid via the converter 13 and drives via the drive pinion 22 the internal geared ring 23 of the bearing 9 connected to the rotor blade 6. The evaluation unit 16 connected to the control unit 14 is connected to a signal output of the at least one means 15*a*, 15*b* or 15*c*. The means 15*a*, 15*b* and 15*c* are in this example constructed as a resolver, wherein the means 15*a* are driven by the drive pinion 22 disposed on the slow shaft 21 of the adjusting motor 10, the means 15*b* are driven by the internal geared ring 23 of the bearing 9 connected to the rotor blade 6, and the means 15*c* are driven by the fast shaft of the adjusting motor. The means 15*d* are integrated in the converter and transmit the current and/or voltage curve supplied from the converter 13 to the adjusting motor as a signal to the evaluation unit 16. The signal $S_1$ is processed in the evaluation unit 16, unless already provided as an absolute angular position by the means 15*a*, 15*b* or 15*c*. The signals $S_{1a}$, $S_{1b}$, $S_{1c}$ from the means 15*a*, 15*b* and 15*c* or the derivative of the signals $S_{1a}$, $S_{1b}$, $S_{1c}$ is thereafter compared in the evaluation unit 16 with threshold values A stored in a memory 26 of the control unit 14. With a first threshold value $\lambda_1$ is reached, the evaluation unit 16 transmits a signal to the control unit 14, wherein the control unit 14 interrupts the current and/or voltage supply from the converter 13 to the adjusting motor 10, thereby terminating the blade adjustment process.

FIG. 5 shows another embodiment of the adjusting device 1 according to the invention. In this embodiment, the first device 11 for determining a blade position is supplemented with an emergency shutdown device 12 for determining a blade position. The emergency shutdown device 12 includes means 17 for generating a signal $S_2$ depending on the blade position and an evaluation unit 18 for processing and comparing the signal $S_2$ or a derivative of the signal $S_2$ with stored threshold values $\lambda$. The means 17 and the evaluation unit 18 of the emergency shutdown device 12 are not the same as those of the first device 11. The threshold values may be stored in the same memory 26 as the threshold values of the first device 11 or may be stored in a separate memory. The second means 17 are in this example constructed as resolvers, absolute sensors, potentiometric sensors or incremental sensors, and can be driven by the drive pinion 22 of the adjusting motor 10, by the internal geared ring 23 or by the fast shaft of the adjusting motor 10. However, the means 17 may also be integrated in the converter 10 and the signal $S_2$ may be transmitted as current and/or voltage curve to the evaluation unit 18. The second evaluation unit 18 compares the position the rotor blade 6 in parallel with the first evaluation unit 16. When the first threshold value $\lambda_1$ is crossed without the first evaluation unit 16 having terminated the blade adjustment process, a signal $S_{St}$ is sent from the second evaluation unit 18 to the control unit 14 when a second threshold value $\lambda_2$ is reached, and the control unit 14 completely disconnects the adjusting device 1 from the voltage supply.

FIG. 6 shows another embodiment of the adjusting device 1 according to the invention. The emergency shutdown device 12 for determining a blade position is in this example constructed as a microswitch 19. The microswitch 19 is arranged on the hub 8 so that an actuating element disposed on the rotor blade 6 actuates the microswitch 19 when a predetermined blade position is reached. However, the microswitch 19 could also be arranged on the rotor blade 6 and actuated by an actuating element disposed on the hub. The microswitch 19 is directly connected to the control unit 14 and transmits upon actuation to the control unit 14 a signal S for disconnecting the adjusting device 1 from the voltage supply.

FIG. 7 illustrates the processing steps in the evaluation unit 16, 18. At step I, the evaluation unit 16, 18 receives and analyzes a signal from one or more of the means 15a, 15b, 15c, 15d, 17 for generating a signal S depending on the blade position. When the signal is supplied as an absolute angular position, step III is executed directly after step I; otherwise, the signal is processed at step II. Processing may include, for example, comparing a change in the angle provided by one of the means 15a, 15b, 17 with a reference value from another sensor and thus determining the absolute position of the rotor blade 6, or calculating a position from the sinusoidal current signal of the adjusting motor 10. At step III, the signal $S_1$, $S_2$ provided by the means or the derivative of the signal $S_1$, $S_2$ processed by the evaluation unit 16, 18 is compared with stored threshold values $\lambda$. When a threshold value $\lambda$ is reached, the evaluation unit 16, 18 sends a signal $S_{St}$ to the control unit 14. Depending on the attained threshold value $\lambda$, the blade adjustment process is then either terminated or the current and/or voltage supply to the adjusting device 1 is interrupted.

The combinations of features disclosed in the described exemplary embodiments to not to be understood as limiting the invention; instead, the features of the different embodiments can also be combined with each other.

List of reference symbols

| | |
|---|---|
| 1 | Adjusting device |
| 2 | Wind turbine |
| 3 | Tower |
| 4 | Nacelle |
| 5 | Rotor |
| 6 | Rotor blade |
| 7 | Blade axis |
| 8 | Hub |
| 9 | Bearing |
| 10 | Adjusting motor |
| 11 | Device for determining a blade position |
| 12 | Emergency shutoff device |
| 13 | Converter |
| 14 | Control unit |
| 15 | Sensor |
| 15a | Means for generation a signal depending on the pitch position |
| 15b | Means for generation a signal depending on the pitch position |
| 15c | Means for generation a signal depending on the pitch position |
| 16 | Evaluation unit |
| 17 | Means for generation a signal depending on the pitch position |
| 18 | Evaluation unit |
| 19 | Limit switch |
| 20 | Inner ring |
| 21 | Slow output shaft of the adjusting motor |
| 22 | Drive pinion |
| 23 | Internal geared ring |
| 24 | Gear wheel |
| 25 | Gear wheel |
| 26 | Memory |
| 27 | Gear box |
| 28 | Pinion |
| 29 | Outer ring |
| S | Signal |
| $S_{1a}$ | Signal depending on the blade position |
| $S_{1b}$ | Signal depending on the blade position |
| $S_{1c}$ | Signal depending on the blade position |
| $S_2$ | Signal depending on the blade position |
| $S_{St}$ | Signal sent to control unit |
| $\lambda$ | Threshold values |
| $\lambda_1$ | First threshold value |
| $\lambda_2$ | Second threshold value |
| $\lambda_3$ | Third threshold value |

The invention claimed is:

1. Adjusting device for a rotor blade of a rotor of a wind turbine,
comprising a rotor comprising a hub and at least one rotor blade,
the rotor blade being installable on a bearing which is installable between the rotor blade and the hub,
the rotor blade being adjustably arranged on the hub in different pitch positions for rotation about a blade axis which extends in an axial direction of the rotor blade,
the adjusting device comprising an adjusting motor for driving and/or locking the rotor blade, a first device for determining a blade position, and a converter for controlling the adjusting motor
the converter comprising at least one control unit,
wherein
the first device comprises at least two first means for generating a respective electrical signal ($S_{1a}$, $S_{1b}$) that depends on the pitch position,
the control unit and/or at least one evaluation unit have at least one signal input associated with a signal output of the at least two first means,
the control unit can being connectable to the at least one evaluation unit for checking a redundancy of the electrical signals ($S_{1a}$, $S_{1b}$) of the at least two first means and for comparing the signals ($S_{1a}$, $S_{1b}$) of the at least two first means or a derivative of the signals ($S_{1a}$, $S_{1b}$) with at least one stored threshold value ($\lambda$),
and the control unit and/or the evaluation unit are configured so as to terminate a blade adjustment process when a first threshold value ($\lambda_1$) is exceeded.

2. Adjusting device according to claim 1, wherein the at least two first means comprises a resolver, potentiometric sensor, absolute sensor and/or incremental sensor.

3. Adjusting device according to claim 2, wherein the at least two first means are driven by a sprocket of the bearing of the adjusting device, by a slow output shaft of the adjusting motor, or by a fast shaft of the adjusting motor.

4. Adjusting device according to claim 1, wherein the at least two first means are integrated in the converter and the generated signal is a current and/or voltage curve signal supplied from the converter to the adjusting motor.

5. Adjusting device according to claim 1, wherein the adjusting device comprises an emergency shutdown device for determining a blade position and the control unit is configured so that the adjusting device can be disconnected from a voltage supply when the second blade position is reached.

6. Adjusting device according to claim 5, wherein the emergency shutdown device comprises second means for generating a signal ($S_2$) depending on the pitch position and an evaluation unit for comparing the signal ($S_2$) or a derivative of the signal ($S_1$) with a second stored threshold value ($\lambda_2$).

7. Adjusting device according to claim 6, wherein the device for determining a first pitch position of the rotor blade and the emergency shutdown device for determining a second pitch position of the rotor blade each use the same first means for generating a signal ($S_1$) depending on the pitch position and each use the same evaluation unit, or each use the same first means but separate evaluation units, or each use separate first and second means for generating a signal ($S_1$, $S_2$) depending on the pitch position and separate evaluation units.

8. Adjusting device according to claim 6, wherein the emergency shutdown device comprises a mechanical limit switch and an actuating element cooperating therewith, and the limit switch is actuated mechanically when the actuating element reaches the second blade position.

9. Adjusting device according to claim 1, wherein the first threshold value ($\lambda_1$) is located in a range between 85° and 95°, a second threshold value ($\lambda_2$) or the blade position for switching the limit switch is located in an adjacent range between 95° and 100°, and a third threshold value ($\lambda_3$) for limiting the blade adjustment range in the operating direction is located between 0° and −10°.

10. Wind turbine with a nacelle supported for rotation on a tower and a rotor connected via a drive shaft to a generator installed in the nacelle; wherein the rotor comprises a hub and at least one rotor blade connected to the hub by way of a bearing for rotation about a blade axis extending in an axial direction of the rotor blade, and wherein the rotor blade is driven by an adjusting device and can be stopped in several pitch positions, wherein the adjusting device is constructed according to claim 1.

11. A method for terminating a blade adjustment process of a rotor blade of a rotor of a wind turbine, wherein the rotor blade can be adjusted with an adjusting device according to claim 1, comprising the steps of:
  Generating a signal for adjusting the rotor blade in the control unit,
  Transmitting a signal for adjusting the rotor blade from the control unit to the converter,
  Applying a current and/or a voltage to the adjusting motor with the converter,
  Determining a pitch position of the rotor blade and generating with first means a signal ($S_{1a}$, $S_{1b}$) depending on the pitch position,
  Transmitting the signal from the first means directly or indirectly to the evaluation unit,
  Comparing the signals ($S_{1a}$, $S_{1b}$) in the evaluation unit with threshold values ($\lambda$) stored in a memory,
  and when the first threshold value ($\lambda_1$) is reached, generating in the evaluation unit a signal ($S_{St}$) for terminating the blade adjustment process, and transmitting the signal ($S_{St}$) to the control unit.

12. The method according to claim 11, wherein the signal ($S_{1a}$) and/or the signal ($S_{1b}$) are processed by the evaluation unit before the comparison.

13. The method according to claim 11, wherein the rotor blade can be adjusted by an adjusting device comprising the steps of:
  Determining a pitch position of the rotor blade and generating with second means a signal ($S_2$) depending on the pitch position,
  Transmitting the signal from second means directly or indirectly to the evaluation unit,
  Comparing the signal ($S_2$) in the evaluation unit with threshold values ($\lambda$) stored in a memory,
  and when the first threshold value ($\lambda_1$) is exceeded without the adjustment process being terminated and when a second threshold value ($\lambda_2$) is reached, generating in the evaluation unit a signal ($S_{St}$) for disconnecting the adjusting device from the voltage supply, and transmitting the signal ($S_{St}$) to the control unit.

14. The method according to claim 13, wherein the signal ($S_2$) is processed by the evaluation unit before the comparison with a stored threshold value ($\lambda$).

\* \* \* \* \*